(12) United States Patent
Wei et al.

(10) Patent No.: US 6,416,677 B1
(45) Date of Patent: Jul. 9, 2002

(54) NARROW TRACK STITCHED GMR HEAD

(75) Inventors: Hsiang-Yi Wei, Milpitas; Yi-Ting Yao, Pleasanton; Eiki Narumi, Cupertino; Chyu-Jiuh Torng, Pleasanton; Cherng-Chyi Han, San Jose, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 142 days.

(21) Appl. No.: 09/585,785

(22) Filed: Jun. 5, 2000

(51) Int. Cl.[7] .................................................. B44C 1/22
(52) U.S. Cl. ........................... 216/22; 216/40; 216/41; 216/58; 216/66
(58) Field of Search ........................... 360/113; 216/22, 216/27, 40, 41, 47, 53, 58, 13, 17, 12; 29/603.14; 438/297; 430/316, 311

(56) References Cited

U.S. PATENT DOCUMENTS

| | | | |
|---|---|---|---|
| 5,491,600 A | 2/1996 | Chen et al. ................. | 360/113 |
| 5,649,351 A | 7/1997 | Cole et al. ................. | 29/603.14 |
| 5,728,619 A * | 3/1998 | Tsai ............................ | 438/297 |
| 5,883,764 A | 3/1999 | Pinarbasi .................... | 360/113 |
| 6,063,699 A * | 5/2000 | Hanafi et al. ............... | 438/589 |

* cited by examiner

*Primary Examiner*—Randy Gulakowski
*Assistant Examiner*—Gentle E Winter
(74) *Attorney, Agent, or Firm*—George O. Saile; Stephen B. Ackerman

(57) ABSTRACT

As the read capabilities of magnetic disk systems improve due to advanced GMR heads, it becomes necessary to correspondingly reduce the area of recorded data. This requires a narrowing of the stitched sub-pole at the write gap. This has proved difficult for pole widths less than about 0.4 microns because of problems in filling the mold. In the present invention this is overcome by introducing a layer of PMGI (polydimethylglutarimide) between the planarized positive photoresist layer that comprises the mold and the non-magnetic write gap layer on which the mold rests. This greatly facilitates formation of a high aspect ratio hole with a clean flat bottom and essentially vertical sides as well as the subsequent removal of the photoresist after said hole has been filled through electroplating to form a stitched sub-pole.

16 Claims, 5 Drawing Sheets

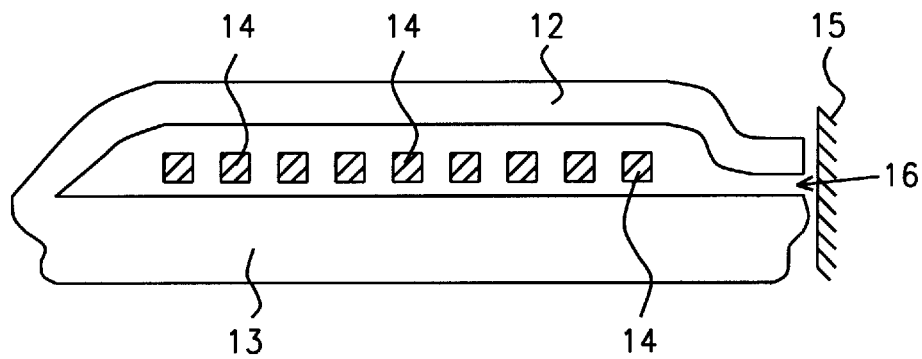
FIG. 1 - Prior Art
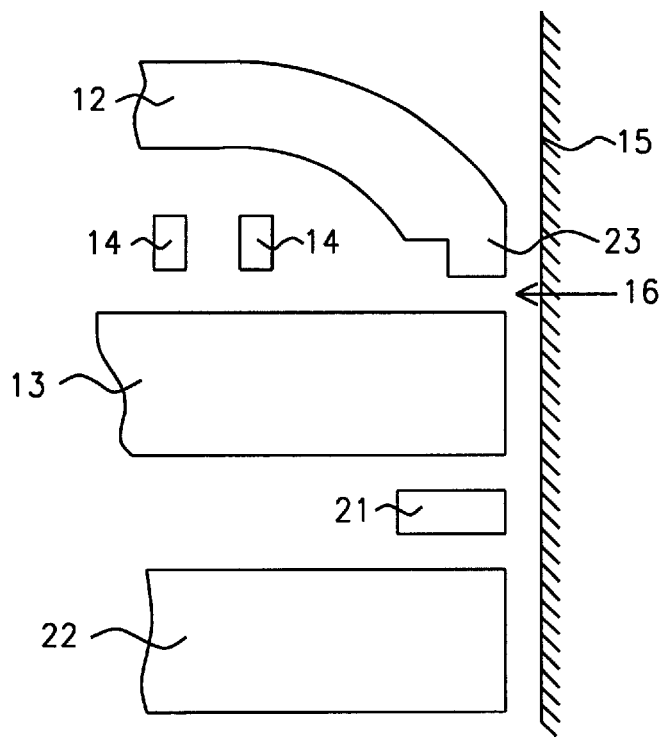
FIG. 2 - Prior Art

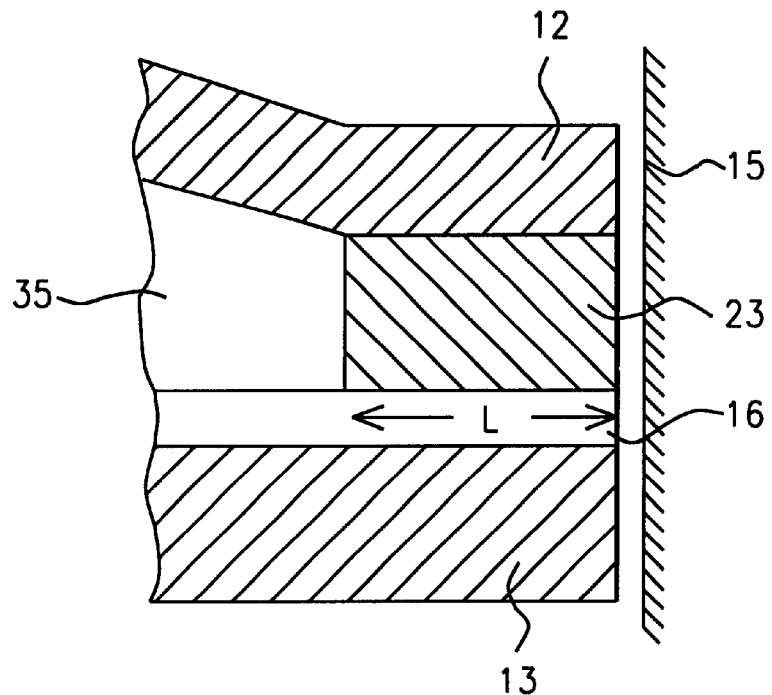
FIG. 3 - Prior Art
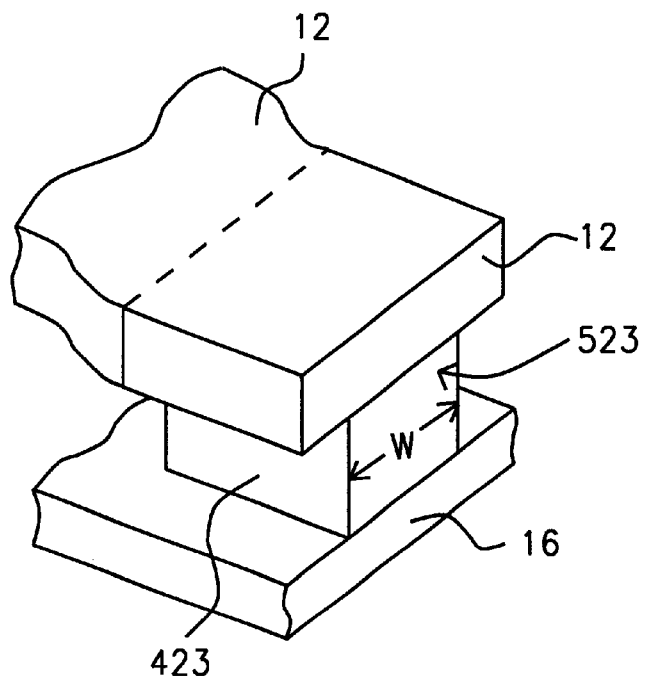
FIG. 4 - Prior Art

NARROW TRACK STITCHED GMR HEAD

FIELD OF THE INVENTION

The invention relates to the general field of read-write heads for magnetic disk systems with particular reference to reducing the lengths of tracks recorded using stitched heads.

BACKGROUND OF THE INVENTION

An example of a read-write head for a magnetic disk system is schematically illustrated in FIG. 1. The magnetic field that 'writes' a bit at the surface of recording medium 15 is generated by a flat coil whose windings 14 can be seen in the figure. The magnetic flux generated by the flat coil is concentrated within upper and lower pole pieces 12 and 13 respectively which, while being connected at a point on the extreme left of the figure, are separated by small gap 16. Thus, most of the magnetic flux generated by the flat coil passes across this gap with fringing fields extending out for a short distance where the field is still powerful enough to magnetize a small portion of recoding medium 15. The distance between pole pieces 12 and 13 and writeable surface 15 is typically between about 10 and 50 nm.

In practice, lower pole 13 is also used as a magnetic shield for the reading assembly that is located immediately adjacent to it, being therefore referred to as a shared magnetic layer. The rest of the head is shown in FIG. 2 and is made up of reading element 21 and a second shield 22. The reading element 21 is itself a composite of many layers. Also detailed in FIG. 2 is the structure of upper pole 12 near the gap 16. Seen there is sub-pole 23 whose area (at the gap) is significantly less than that of the opposing flat portions of 12 and 13 that make up the gap region 16 in FIG. 1. The introduction of this sub-pole serves to further concentrate the magnetic flux across gap 16 making for more intense fringing fields in its vicinity. A more detailed view of the sub-pole assembly is shown in FIG. 3. As can be seen, sub-pole 23 is separately formed relative to upper pole 12 and so the full structure is sometimes referred to as a 'stitched' head. Layer 16 defines the write gap and can be a metal or an insulator. The remaining space 35 is filled with an insulating material.

The principle governing the operation of read sensor 21 is the change of resistivity of certain materials in the presence of a magnetic field (magneto-resistance). In particular, most magnetic materials exhibit anisotropic behavior in that they have a preferred direction along which they are most easily magnetized (known as the easy axis). The magneto-resistance effect manifests itself as an increase in resistivity when the material is magnetized in a direction perpendicular to the easy axis, said increase being reduced to zero when magnetization is along the easy axis. Thus, any magnetic field that changes the direction of magnetization in a magneto-resistive material can be detected as a change in resistance.

The magneto-resistance effect can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The improvements provided by GMR devices, in the density of magnetic data that can be read, are of little value if there is no corresponding increase in the density of magnetic data that can be written. Thus there is a need for ultrahigh density recording heads with sub-poles having sub-micron widths. As we will detail below, formation of sub-pole 23 involves the use of exceptionally thick layers of photoresist (up to 7 microns) while at the same time keeping the width of sub-pole 23 even narrower than 0.5 microns with vertical side-walls. This is very difficult for conventional photoresist processes. The width in question is marked as W in FIG. 4 which is an isometric representation of FIG. 3. Note that the front surface 523 of the structure seen in FIG. 4 is part of a plane, known as the air bearing surface (ABS), that flies past recording surface 15 (of FIG. 3).

The present invention is therefore directed towards a method for manufacturing the three dimensional object 423 of FIG. 4 whose front surface is shown there as 523. It has been found that several problems arise once width W goes below about 0.5 microns. The present invention shows how these problems may be overcome.

A routine search of the prior art was performed but no references that teach the exact processes and structures of the present invention were discovered. Several references of interest were, however, encountered along the way. For example, Pinarbasi in U.S. Pat. No. 5,883,764 uses PMGI in a liftoff process while forming a GMR element. In U.S. Pat. No. 5,491,600 Chen et al. teach a similar approach to that later adopted by Pinarbasi while, in U.S. Pat. No. 5,649,351, Cole et al. teach how to form a doubly stitched sub-pole.

SUMMARY OF THE INVENTION

It has been an object of the present invention to provide a process for manufacturing a narrow track stitched head for ultrahigh density magnetic recording applications.

A further object of the invention has been that said write head take full advantage of the densities that can be read with advanced GMR heads.

Another object of the invention has been to provide a process for forming a mold, in photoresist, having narrow width and high aspect ratio.

Still another object of the invention has been to fill said narrow mold with metal that is free of flaws and irregularities.

These objects have been achieved by introducing a layer of PMGI (poly-dimethylglutarimide) between the planarized positive photoresist layer that comprises the mold and the non-magnetic write gap layer on which the mold rests. This greatly facilitates formation of a high aspect ratio hole with a clean flat bottom and essentially vertical sides as well as the subsequent removal of the photoresist after said hole has been filled through electroplating to form a stitched sub-pole.

BRIEF DESCRIPTION OF THE DRAWINGS

FIG. 1 is a schematic cross-sectional view of a write head.

FIG. 2 is a close-up of part of FIG. 1 additionally showing the read portions of the head.

FIG. 3 is a closeup of the write portion of FIG. 2.

FIG. 4 is an isometric view of FIG. 3.

DESCRIPTION OF THE PREFERRED EMBODIMENTS

Figure 5:
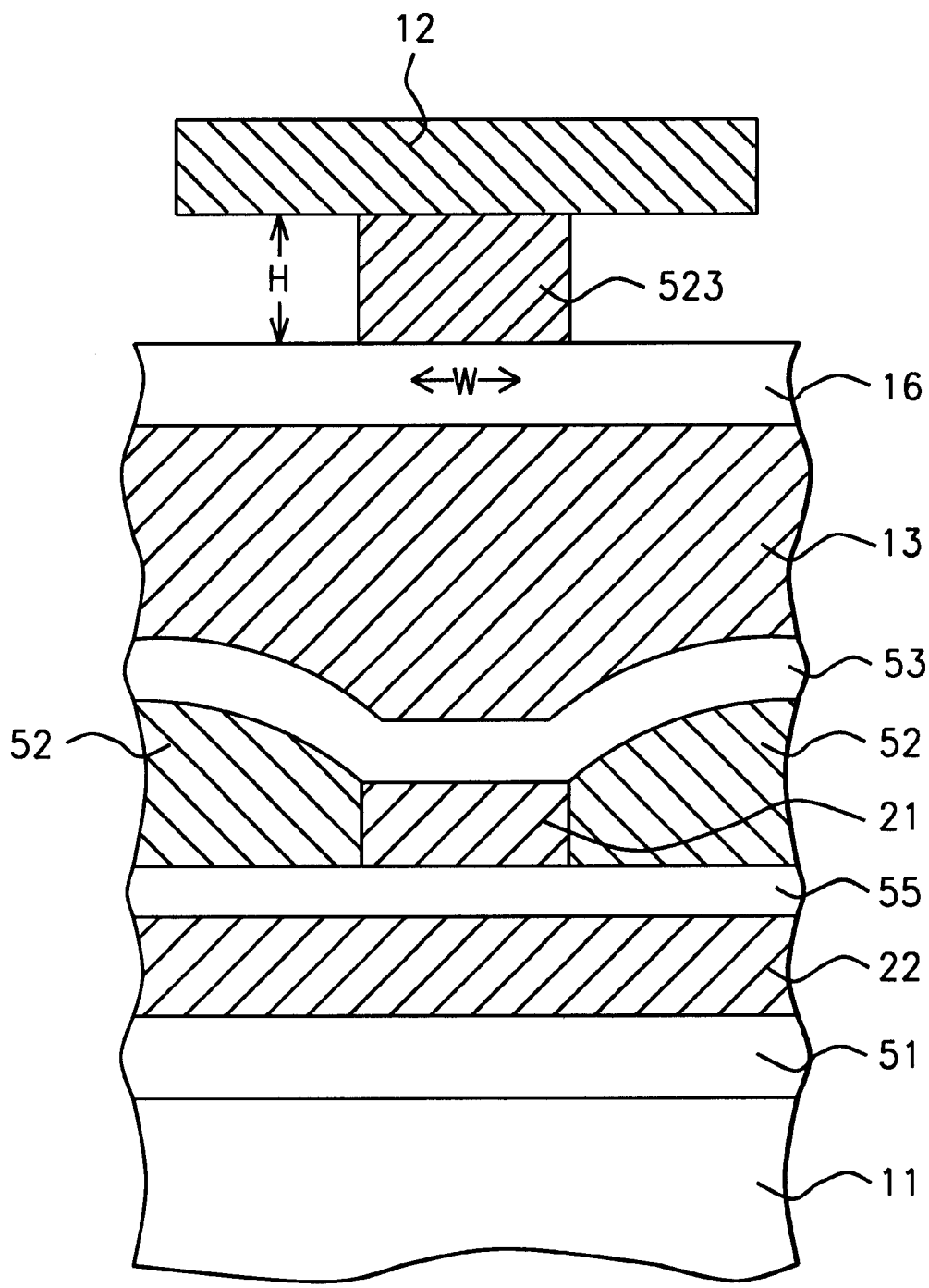
FIG. 5 is the ABS view of the read-write head.

FIG. 5 is the ABS view (i.e. looking away from the plane of recording surface 15) of the structure seen previously in more schematic form in FIG. 2. Additional features not shown in FIG. 2 include an insulating substrate 11, an undercoat layer 51 (needed to smooth out the substrate surface), two insulated separation layers 55 and 53, and layer 52 that provide a longitudinal magnetic bias to GMR head 21 to suppress Barkhausen noise. Typically the height H of sub-pole 523 is between about 1 and 5 microns while, as noted earlier, the area of interest of the present invention covers cases where width W is below about 0.5 microns. Stated differently, the present invention is concerned with situations in which the aspect ratio of 523 becomes greater than about 10:1.

The process for the manufacture of sub-pole 423 (FIG. 4) begins with the provision of the structure seen in FIG. 5 (before the addition of 12 and 523). Prior to the deposition of gap layer 16, the surface of shared layer 13 will approximate the contours of layers 21 and 52 so it will have to be planarized first. Chemical mechanical polishing (CMP) is most commonly used for this purpose but any suitable planarizing method could equally well have been used.

Figure 6:
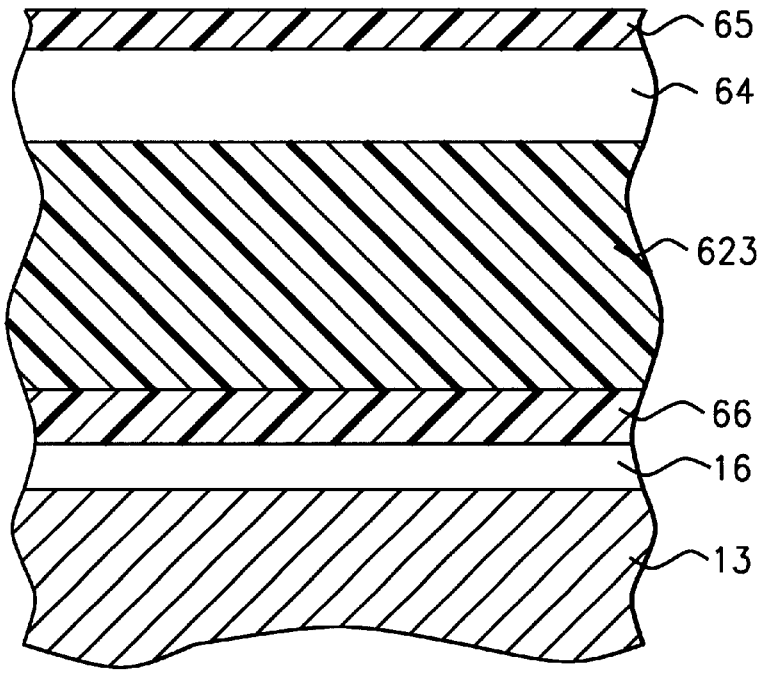
FIGS. 6–8 illustrate steps in the manufacture of a high aspect ratio hole suitable to serve as a mold for forming the sub-pole.

Referring now to FIG. 6, after planarization, a non-magnetic material, such as copper, nickel-copper, or alumina is deposited on the top surface of 13, to a thickness between about 500 and 3,000 Angstroms so as to form write gap layer 16.

Then, as a key feature of the invention and representing a departure from prior art practice, layer 66 of PMGI, between about 0.1 and 0.9 microns thick, is deposited on write gap layer 16. PMGI is polydimethylglutarimide, a material characterized by being patternable through exposure to light in the same way as conventional photoresist but which, unlike photoresist, can be easily dissolved in solvents such as NMP (N-methylpyrrolidone) or acetone. It is normally used during a liftoff process wherein an etch mask is made up of an upper layer of conventional photoresist and a lower layer of PMGI. After patterning, the PMGI remains beneath the surviving photresist, having also been removed everywhere else.

Next, a layer of planarized positive photoresist 623 is deposited over PMGI layer 66. The thickness of 623 is between about 1 and 7 microns. This will determine the depth of a hole that is to be formed in 623 for use as a mold in growing sub-pole 423. Then, layer 64 of silicon oxide, between about 0.2 and 0.7 microns thick, is deposited on layer 623 of positive photoresist. This is followed by the deposition of layer 65 of IPR (image planarized photoresist), between about 0.3 and 1.2 microns thick, on the layer of silicon oxide.

Figure 7:
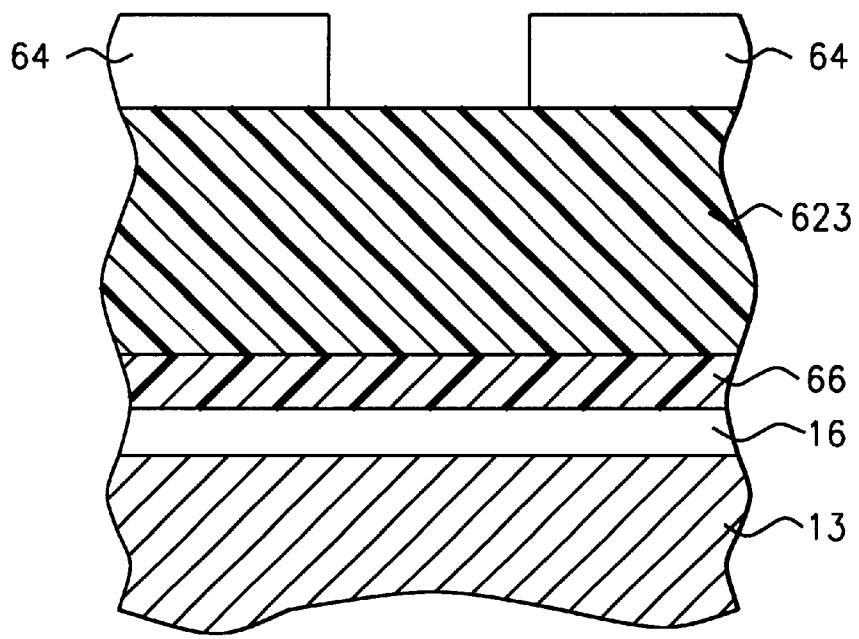

Using conventional photolithographic techniques, the layer 65 of IPR is then exposed and developed to form an etch mask that defines the width W (FIG. 4) and the length L (FIG. 3) of the above-mentioned hole (which may be seen by looking ahead to FIG. 7)

Then, reactive ion etching (RIE) is used to open up layer 64. During RIE an inductively coupled plasma that includes trifluoro-methane, methane, helium, and oxygen, is used at a power level between about 50 and 100 watts. Under these conditions the IPR mask is slowly attacked during RIE but is thick enough to survive until silicon oxide layer 64 has been fully penetrated. At this point, layer 64 becomes a hard mask, as shown in FIG. 7, so etching of layer 623 can proceed without compromising the dimensions L and W. Silicon oxide continues to be removed throughout the process.

Etching continues until both layers 66 and 623 have been fully removed. It has been found difficult to fully remove the planarized resist 623 after plating. In the present invention, PMGI is used to ensure good photoresist stripping after plating. The result, as illustrated in FIG. 8, is a well defined hole 81 that has a flat, contaminant-free bottom surface and side-walls that slope away from the vertical by less than about 5 degrees.

Figure 8:
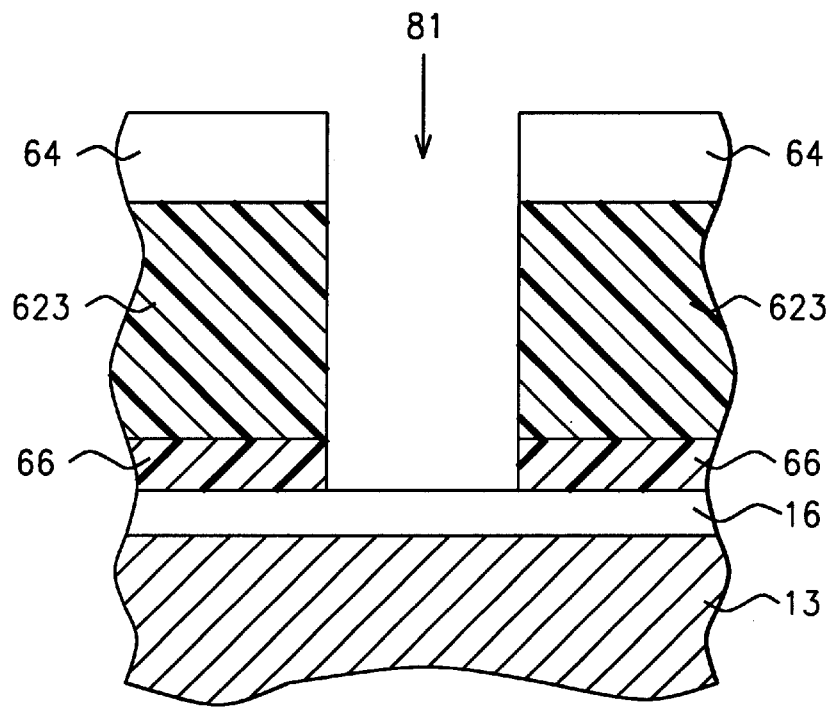
Figure 9:
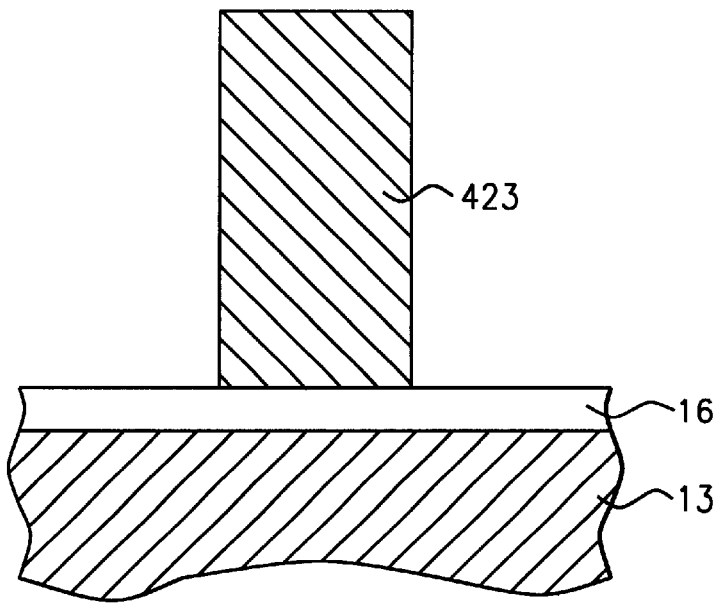
FIG. 9 shows the completed sub-pole piece, formed according to the teachings of the present invention.

The structure seen in FIG. 8 can now be used as a mold, or frame, for growing sub pole piece 423 by means of electroplating. A suitable magnetic material such as nickel, iron, or cobalt-nickel-iron is used for this. Once hole 81 has been filled (or nearly filled) with this magnetic material, all photoresist layers, including 623, any residue of 65, and layer 66 are removed, thereby forming the desired stitched pole piece 423 seen in FIG. 9. Because of the careful choice of the thickness of layer 623, the height of 423 ends up being between about 1 and 5 microns. Note that the presence of the PMGI layer 66 under positive photoresist layer 623 greatly facilitates the removal of the latter. This is an additional, and also key, feature of the present invention.

The effectiveness of the present invention is exemplified by the data summarized in TABLE I below. This compares the IPR CD (critical dimension or minimum achievable width) with the CD of P2, the plated sub-pole.

TABLE I

| IPR CD ($\mu$m) | P2 CD after plate ($\mu$m) |
|---|---|
| 0.59 | 0.498 |
| 0.63 | 0.509 |
| 0.562 | 0.446 |
| 0.567 | 0.462 |
| 0.427 | 0.215 |
| 0.47 | 0.283 |
| 0.4 | 0.161 |
| 0.41 | 0.176 |

The data in TABLE I shows that by using the current invention we can achieve sub-micron (0.6 micron) write poles for future high data GMR head applications.

While the invention has been particularly shown and described with reference to the preferred embodiments thereof, it will be understood by those skilled in the art that various changes in form and details may be made without departing from the spirit and scope of the invention.

What is claimed is:

1. A process for forming a hole, having a width, a length, and a depth, comprising:

providing a substrate having a flat surface;

depositing a layer of PMGI, between about 0.1 and 0.9 microns thick, on said flat surface;

depositing a layer of a positive photoresist, between about 1 and 7 microns thick, on the layer of PMGI, thereby defining the depth of the hole;

depositing a layer of silicon oxide, between about 0.2 and 0.7 microns thick, on-said layer of positive photoresist;

depositing a layer of image planarized photoresist, between about 0.3 and 1.2 microns thick, on the layer of silicon oxide;

patterning the IPR layer to from a mask that defines the width and length of the hole;

then, by means of reactive ion etching, first etching the layer of silicon oxide, thereby forming a hard mask, and then etching the layers of positive photoresist and PMGI whereby the hole is formed, said hole having a flat, contaminant-free bottom surface and side-walls that slope away from vertical by less than about 5 degrees.

2. The process of claim 1 wherein the ratio of said depth to said width is greater than about 10:1.

3. The process of claim 1 wherein the width of the hole is between about 0.1 and 1 microns.

4. The process of claim 1 wherein the length of the hole is between about 3 and 30 microns.

5. The process of claim 1 wherein the depth of the hole is between about 1 and 7 microns.

6. The process of claim 1 wherein patterning the IPR layer is performed using conventional photolithographic techniques.

7. The process of claim 1 wherein the step of reactive ion etching further comprises using an inductively coupled plasma that includes trifluoro-methane, methane, helium, and oxygen at a power level between about 50 and 100 watts.

8. A process for manufacturing a stitched pole piece as part of a write-head for a magnetic disk system, comprising:

providing a partially completed read-write head for said disk system that further comprises a substrate, a first magnetic shield layer on the substrate, a first insulating layer on the first magnetic shield layer, a GMR sensor device on the first insulating layer, opposing longitudinal bias electrodes flanking the GMR sensor, a second insulating layer on the GMR sensor and bias electrodes, and a second magnetic shield layer, having a top surface, on the second insulating layer;

planarizing said top surface;

depositing non-magnetic conductive material on the planarized top surface, thereby forming a write gap layer;

depositing a layer of PMGI, between about 0.1 and 0.9 microns thick, on said write gap layer;

depositing a layer of a positive photoresist, between about 1 and 7 microns thick, on the layer of PMGI, thereby defining the depth of a hole;

depositing a layer of silicon oxide, between about 0.2 and 0.7 microns thick, on said layer of positive photoresist;

depositing a layer of IPR, between about 0.3 and 1.2 microns thick, on the layer of silicon oxide;

patterning the IPR layer to from a mask that defines the width and length of said hole;

then, by means of reactive ion etching, first etching the layer of silicon oxide, thereby forming a hard mask, and then etching the layers of positive photoresist and PMGI whereby the hole is formed, said hole having a flat, contaminant-free bottom surface and side-walls that slope away from vertical by less than about 5 degrees;

through electroplating, filling the hole with a magnetic material; and removing all photoresist layers and the PMGI layer, whereby removal of the PMGI layer facilitates removal of the photoresist layers, thereby forming the stitched pole piece.

9. The process of claim 8 wherein the width of the stitched pole piece is between about 0.1 and 1 microns.

10. The process of claim 8 wherein the length of the stitched pole piece is between about 3 and 30 microns.

11. The process of claim 8 wherein the stitched pole piece has a height that is between about 1 and 7 microns.

12. The process of claim 8 wherein patterning the IPR layer is performed using conventional photolithographic techniques.

13. The process of claim 8 wherein the step of reactive ion etching further comprises using an inductively coupled plasma that includes trifluoro-methane, methane, helium, and oxygen at a power level between about 50 and 100 watts.

14. The process of claim 8 wherein the GMR sensor has a length between about 0.1 and 0.7 microns.

15. The process of claim 8 wherein the write gap layer is deposited to a thickness between about 0.05 and 0.3 microns.

16. The process of claim 8 wherein the magnetic material used to fill the hole is nickel-iron or cobalt-nickel-iron.

* * * * *